Figure 1:
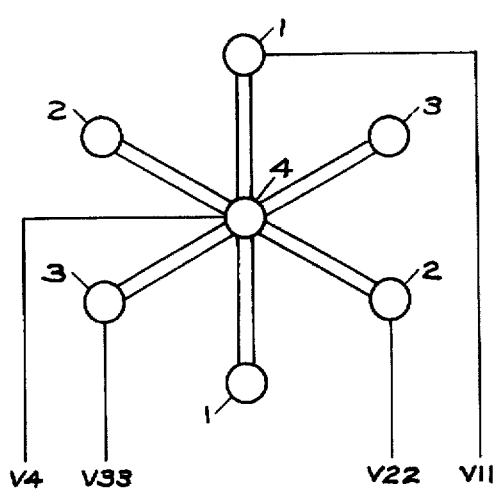

United States Patent

Massa et al.

[11] Patent Number: 5,729,507
[45] Date of Patent: Mar. 17, 1998

[54] DIRECTIONAL ENERGY RECEIVING SYSTEMS FOR USE IN THE INDICATION OF THE DIRECTION OF ARRIVAL OF THE RECEIVED SIGNAL

[75] Inventors: Frank Massa; Donald P. Massa, both of Hingham, Mass.

[73] Assignee: Massa Products Corporation, Hingham, Mass.

[21] Appl. No.: 733,456

[22] Filed: May 13, 1985

[51] Int. Cl.$^6$ .................................................. G01S 3/80
[52] U.S. Cl. ........................................ 367/124; 367/126
[58] Field of Search .............................. 367/124, 126; 343/429, 432, 434

[56] References Cited

U.S. PATENT DOCUMENTS

| | | | |
|---|---|---|---|
| 2,324,548 | 7/1943 | Wheeler | 343/432 |
| 4,305,141 | 12/1981 | Massa | 367/105 |

*Primary Examiner*—Daniel T. Pihulic

[57] ABSTRACT

The bearing accuracy and long-range sonar target detection capability of a multi-cardioid directional receiving hydrophone array is improved by electronically producing mirror images of the cardioid directional patterns of each directional hydrophone in the array whereby the number of receiving channels are effectively doubled by this invention which in turn results in higher signal-to-noise ratios especially when receiving distant relatively weaker sonar signals. As a result, the accuracy of measurement of target range and bearing by the improved directional hydrophone array will be significantly increased.

6 Claims, 1 Drawing Sheet

5,729,507

DIRECTIONAL ENERGY RECEIVING SYSTEMS FOR USE IN THE INDICATION OF THE DIRECTION OF ARRIVAL OF THE RECEIVED SIGNAL

This invention relates to and is an improvement of the invention disclosed in U.S. Pat. Nos. 4,198,705 and 4,305, 141 issued to one of the inventors of this Application. U.S. Pat. No. 4,198,705 describes a fixed array of three identical directional receivers, each having a cardioid directional pattern within its angular zone of operation and arranged in a symmetrical configuration in a horizontal plane with each receiver having its principal axis of maximum sensitivity oriented 120° from the corresponding principal axes of its neighbors. The novel tri-cardioid receiving array is utilized to indicate the bearing angle of a signal source simply by comparing the relative magnitudes of the voltages generated in each of the three cardioid receivers upon the arrival of the signal. The tri-cardioid receiving array, which is only a fraction of a wavelength in diameter, overcomes the prior art use of large-sized directional receiving transducers several wavelengths in diameter, and also overcomes the need for expensive phase shifting networks and associated commutating means for electronically scanning the prior art receiving arrays to determine the bearing of the signal source such as is required in conventional scanning sonar systems as is well known in the art.

As is described in the reference patents, the bearing of the received signal is instantly determined by comparing the ratios of the magnitudes of the voltages generated among the three cardioid receivers whose principal axes of maximum sensitivity are spaced 120° apart in azimuth. For the tri-cardioid array described in the referenced patents, the amplitude ratios of the voltages generated by any two cardioid elements may be as high as 12 dB for signals arriving along any one of the principal axes of the three cardioids. For these specific axial regions of signal arrivals, the sensitivity of the adjacent cardioids receiving the off-axis signal is lower by 12 dB compared to the on-axis maximum sensitivity of the aligned cardioid which will correspondingly reduce the detection sensitivity of the tri-cardioid array along these specific regions which in turn limits the maximum detection range of the system.

The primary object of this invention is to improve the threshold detection capability of the tri-cardioid receiving array systems described in U.S. Pat. Nos. 4,198,705 and 4,305,141.

Another object of this invention is to increase the number of coaxial cardioid receiving channels that can be obtained from a fixed number of physical structures.

Still another object of this invention is to effectively double the number of overlapping cardioid receiving channels that can be realized from a single tri-cardioid receiving array such that six coaxial directional receiving channels are obtained spaced 60° apart in azimuth thereby resulting in a substantial improvement in the signal-to-noise ratio for the dual tri-cardioid receiving array to be described and thereby achieving improved target detection capability, especially for long-range targets, as a result of using each of the six cardioid receiving channels over only a ±60° sector of azimuth instead of a ±120° sector as is shown for the single tri-cardioid receiving system disclosed in the above referenced patents.

Another object of this invention is to improve the threshold sensitivity of a sonar surveillance system which operates in the audible frequency range and uses a multi-cardioid hydrophone receiving array for target bearing detection.

Still another object of this invention is to improve the bearing accuracy of a tri-cardioid receiving hydrophone array, especially for detecting weak signals from long-range targets, by substantially improving the signal-to-noise ratio of the array.

Another object of this invention is to increase the accuracy of a tri-cardioid hydrophone array in measuring the bearing angle of a weak or distant sound source from a sound reflecting sonar target.

Still another object of this invention is to use a two-cardioid receiving array in a manner that results in a four-cardioid receiving system which improves the threshold sensitivity of the receiving array. These and other objects are accomplished by a preferred embodiment of the invention which may be understood best from a study of the following description and accompanying drawings, in which:

FIG. 1 is a pictorial plan view illustrating three dipole receivers 1—1, 2—2 and 3—3 mounted with their axes of maximum sensitivity oriented 120° from each other in the horizontal plane, and an omnidirectional receiver 4 centrally located along the vertical centerline of the mounted dipoles.

Figure 2:
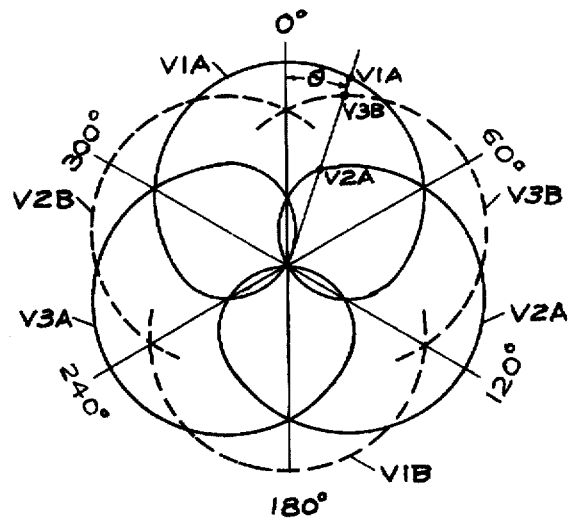

FIG. 2 shows the overlapping horizontal cardioid directional patterns (solid lines) obtained by separately combining the received signal from the omnidirectional receiver with each of the separate dipole receivers mounted as illustrated in FIG. 1. The dotted lines in FIG. 2 show the mirror images of the overlapping cardioid directional patterns obtained by reversing the polarity of the omnidirectional receiver before combining the omnidirectional received signal with each of the dipole receivers illustrated in FIG. 1.

Figure 3:
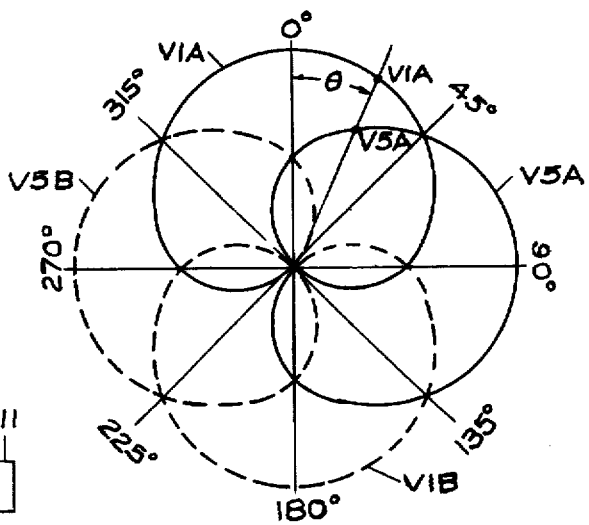

FIG. 3 is a pictorial representation of a two-cardioid receiving array which illustrates an important specific application of this invention for creating an improved 4-channel symmetrical cardioid receiving array from an economical two-channel cardioid system, which results in producing a four-cardioid system with the principal axis of maximum sensitivity of each cardioid oriented 90° from one another.

Figure 4:
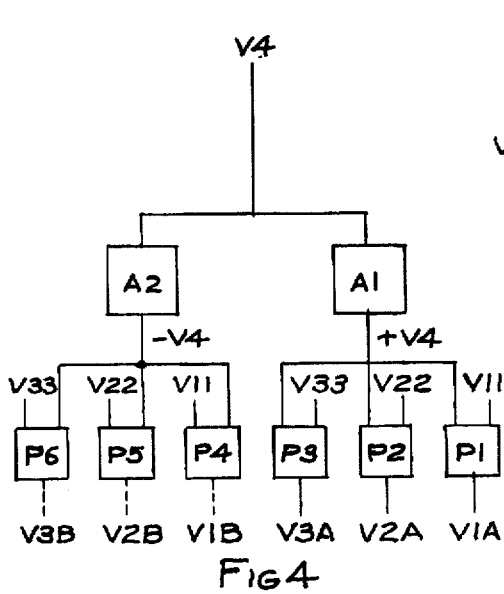

FIG. 4 is a schematic electrical block diagram illustrating a means for combining the output signals V11, V22 and V33 from each of the three dipole pairs 1—1, 2—2 and 3—3 in FIG. 1 with the output signal V4 from the omnidirectional receiver 4 to produce the six cardioid patterns illustrated by the solid and dotted lines in FIG. 2.

Figure 5:
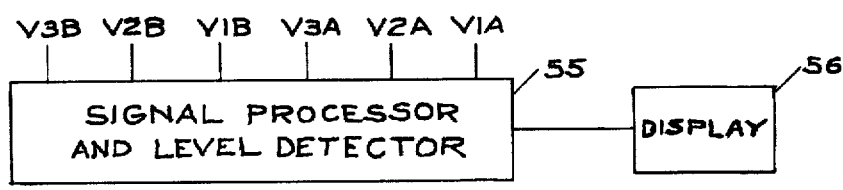

FIG. 5 is a schematic block diagram indicating how the output signals illustrated in FIG. 4 are processed to determine the bearing angle of the receiving signal by the multi-cardioid array.

Referring more specifically to the figures, FIG. 1 illustrates schematically a hydrophone receiving array for achieving a tri-cardioid directional pattern with the principal axis of maximum sensitivity of each cardioid spaced 120° from one another in the horizontal plane. Each of the identical omnidirectional hydrophone pairs 1—1, 2—2 and 3—3 are connected out-of-phase to produce three identical dipole receivers, and each dipole receiver output is separately combined with the output of the center omnidirectional receiving hydrophone 4 to produce three overlapping cardioid receiving channels with their respective azimuth sensitivity patterns V1A, V2A and V3A oriented 120° from each other in the horizontal plane, as illustrated by the solid lines in FIG. 2. The solid line tri-cardioid patterns V1A, V2A and V3A are identical to the tri-cardioid pattern shown in FIG. 4 of U.S. Pat. No. 4,198,705. The derivation of the cardioid directional pattern by combining the output from a dipole pair with the output from an omnidirectional element, as illustrated in FIG. 1, is fully described in U.S. Pat. No.

4,198,705. The technique for producing a cardioid pattern from small omnidirectional receivers is also well known to electroacoustic engineers skilled in the prior art. (See, for example, *Applied Acoustics* by Olson and Massa, 2nd Edition, Blakiston, Philadelphia, 1939, Chapter 5.14, page 142.)

The novel use of the tri-cardioid receiving array illustrated by the solid lines in FIG. 2 to give an instantaneous accurate indication of the bearing angle of arrival of a received acoustic signal simply by comparing the relative magnitudes of the output voltages V1A, V2A and V3A from the three cardioid receivers is fully described in U.S. Pat. No. 4,198,705. For a signal arriving along the bearing axis $\theta°$ in FIG. 2, it can be seen that the maximum voltage output V1A will be generated by the cardioid receiver V1A whose principal axis is facing 0° in azimuth. Considering only the tri-cardioid array represented by the solid lines in FIG. 2, it is evident that the next lower voltage output V2A will be generated by the cardioid receiver V2A whose principal axis is facing 120° in azimuth. It is also evident from the solid line tri-cardioid array plot in FIG. 2 that for signals arriving along the axes 0°, 120° or 240° the output voltage generated in the cardioid receiver whose principal axis is in alignment with the axis of arrival of the received signal will be a maximum and the output from either of the two neighboring cardioid receivers, whose principal axes are located at relative bearing angles of 120° and 240° from the principal axis of the aligned cardioid receiver is 12 dB below the on-axis sensitivity of the aligned receiver whose principal axis is facing 0° in azimuth. For the solid line tri-cardioid array this represents the worst case condition of arrival for the received signal because the sensitivity of either of the two neighboring receivers is −12 dB from the maximum on-axis sensitivity. This results in a corresponding 12 dB reduction in signal-to-noise ratio for the bearing measurement whose accuracy depends on the accuracy of the measurement of the magnitudes of both output signal levels, and thus correspondingly reduces the detection capabililty of the tri-cardioid receiving array for weak signals arriving along the regions of these three principal axes from distant targets.

In order to improve the signal-to-noise ratio and thus the long-range detection capability of the tri-cardioid array, three additional cardioid receiving channels are created by this invention by reversing the phase of the voltage generated by the omnidirectional hydrophone 4 and then combining the reversed phase signal separately with each of the dipole pairs 1—1, 2—2 and 3—3. FIG. 4 shows the schematic circuit for separately connecting the omnidirectional output signal V4 to isolation amplifiers A1 and A2. Amplifier A1 delivers an output voltage with 0° phase shift indicated as +V4 and Amplifier A2 delivers an output voltage with 180° phase shift indicated as −V4. The separately isolated and oppositely phased output signals +V4 and −V4 from the omnidirectional receiving hydrophone 4 are both independently and simultaneously combined with each of the three dipole hydrophone voltages V11, V22 and V33 by the signal processors P1 to P6, as illustrated schematically in FIG. 4, to produce two independent sets of tri-cardioid receiving arrays V1A, V2A, V3A and V1B, V2B, V3B as illustrated by the solid and dotted lines in FIG. 2. As can be seen in FIG. 2, the reversed phase signal −V4 from the omnidirectional hydrophone 4 when combined with the dipole voltages V11, V22 and V33 will produce the three additional cardioid receiving channels V1B, V2B and V3B as shown by the dotted lines and whose principal axes of maximum sensitivity are rotated 180° from the original tri-cardioid receiving channels V1A, V2A and V3A.

It can now be seen by inspection of FIG. 2 that by doubling the number of tri-cardioid channels in the inventive dual tri-cardioid receiving array system, each of the six cardioid arrays illustrated by the solid and dotted lines in FIG. 2 can now be utilized over only 120° of azimuth instead of the 240° azimuth utilization required by the original single tri-cardioid system represented by the solid lines. Thus, the immediate benefit achieved by the effective doubling of the number of tri-cardioid receiving channels by this invention is to improve the signal-to-noise ratio for the worst case conditions of signal arrival along the regions in the vicinity of the principal axes 0°, 120° and 240° of the original tri-cardioid system illustrated by the solid lines in FIG. 2.

The magnitude of improvement in signal-to-noise ratio that is realized by the use of the dual tri-cardioid array system herein described is indicated in FIG. 2 by the increase in sensitivity level from the value V2A, as shown at the intersection of the bearing axis $\theta$ of the received signal with the solid line cardioid V2A, to the sensitivity level V3B as shown by the intersection of the bearing axis $\theta$ with the dotted line cardioid V3B. A comparison of the relative sensitivity ratio V1A vs. V2A as generated in the original tri-cardioid array system with the improved signal-to-noise sensitivity V1A vs. V3B generated in the 6-channel dual tri-cardioid system disclosed in this invention for a signal arriving along a bearing axis $\theta$ is illustrated in FIG. 2. The magnitudes of the improvement have been computed using the same procedure described in column 4, lines 1–45 of U.S. Pat. No. 4,198,705. The results of the computations are listed in Table 1 for bearing angles 0° to 60°. It is obvious from the symmetry of FIG. 2 that the tabulated data will be repeated in the various angular segments which make up the entire 360° azimuth.

TABLE 1

| | RELATIVE SIGNAL LEVELS IN MULTI-CARDIOID ARRAYS IN dB (CARDIOID ON-AXIS SENSITIVITY = 0 dB) | | | | | |
|---|---|---|---|---|---|---|
| COLUMN 1 Bearing | COLUMN 2 V1A Cardioid | COLUMN 3 V2A Cardioid | COLUMN 4 V3B Cardioid | COLUMN 5 V5A Cardioid | COLUMN 6 Improved Sig.-to-Noise Over Tri-Cardioid | COLUMN 7 |
| Angle $\theta°$ | Axis at 0° $1 + \cos \theta$ | Axis at 120° $1 + \cos(120-\theta)$ | Axis at 60° $1 + \cos(60-\theta)$ | Axis at 90° $1 + \cos(90-0)$ | V3B/V2A 6 Cardioid | V5A/V2A 4 Cardioid |
| 0 | 0 dB | −12.0dB | −2.5dB | −6.0dB | 9.5dB | 6.0dB |
| 10 | −0.1 | −9.7 | −1.7 | −4.6 | 8.0 | 5.1 |
| 20 | −0.2 | −7.7 | −1.1 | −3.4 | 6.6 | 4.3 |
| 30 | −0.6 | −6.0 | −0.6 | −2.5 | 5.4 | 3.5 |

TABLE 1-continued

RELATIVE SIGNAL LEVELS IN MULTI-CARDIOID ARRAYS
IN dB (CARDIOID ON-AXIS SENSITIVITY = 0 dB)

| COLUMN 1 Bearing | COLUMN 2 V1A Cardioid | COLUMN 3 V2A Cardioid | COLUMN 4 V3B Cardioid | COLUMN 5 V5A Cardioid | COLUMN 6 Improved Sig.-to-Noise Over Tri-Cardioid | COLUMN 7 |
|---|---|---|---|---|---|---|
| Angle $\theta°$ | Axis at 0° $1 + \cos \theta$ | Axis at 120° $1 + \cos(120-\theta)$ | Axis at 60° $1 + \cos(60-\theta)$ | Axis at 90° $1 + \cos(90-\theta)$ | V3B/V2A 6 Cardioid | V5A/V2A 4 Cardioid |
| 40 | −1.1 | −4.6 | | −1.7 | | 2.9 |
| 45 | −1.3 | −4.0 | | −1.3 | | 2.7 |
| 50 | −1.7 | −3.4 | | | | |
| 60 | −2.5 | −2.5 | | | | |

The data listed in column 6 of Table 1 indicates how the use of the reversed phase mirror image of cardioid V3A (illustrated by the dotted cardioid V3B in FIG. 2) improves the signal-to-noise ratio of the system by as much as 9.5 dB for signals arriving within the zones ±30° of the principal axes 0°, 120°, and 240° of the original tri-cardioid system illustrated by the solid lines in FIG. 2. This very significant improvement in signal-to-noise ratio realized by the use of the herein disclosed reversed phase tri-cardioid mirror image array for measuring the signals arriving within the three ±30° zones centered at 0°, 120° and 240° achieves the major object of this invention.

FIG. 4 shows the schematic electrical connections for producing the six-channel dual tri-cardioid array configuration to achieve the indicated improvement in signal-to-noise ratio by the inventive system over the use of the original three-channel single tri-cardioid array system. The improved signal-to-noise ratios listed in column 6 results from a comparison of the ratios of the output voltages V1A, V2A or V3A with the output voltages V1B, V2B or V3B from the six cardioid receiving channels illustrated in FIG. 2. The six voltages from the dual tri-cardioid arrays are processed as illustrated schematically in FIG. 5, and further described in U.S. Pat. No. 4,198,705, by conventional electronic circuits which are well known in the art and are not a part of this invention.

The circuit logic in the signal processor 55 compares the magnitudes of the voltages V1A, V2A, V3A and V1B, V2B, V3B when they appear at the outputs of the dual tri-cardioid receiving channels. The signal processor 55 will automatically determine which voltage is the largest from among the six channels of the dual tri-cardioid receiving array and thereby establish which of the six 60° zones contains the target bearing information. The signal processor 55 also determines which of the six cardioid channels contains the second largest signal level and thereby accurately determines the target bearing simply by comparing the ratio of the two signals. The target bearing information may be displayed by any well known conventional display means 56, such as an oscilloscope.

A special case of an improved dual cardioid system utilizing the teachings of this invention employs only two cardioid directional receivers as illustrated in FIG. 3. The two cardioid receivers are mounted so that their directional receiving patterns are located at right angles as illustrated by the solid curves V1A and V5A. The mirror images of the two cardioid receivers are shown by the dotted curves V1B and V5B in FIG. 3. The mirror images are produced in the same manner as described and illustrated in FIG. 4 for the tri-cardioid array.

Column 7 in Table 1 shows that an improvement of as much as 6 dB is realized in signal-to-noise ratio by the proposed two cardioid system in combination with their mirror images over the original tri-cardioid receiving system when used without the benefit of the mirror image teachings disclosed in this invention. Thus, the described two-cardioid directional receiving system combined with the mirror images illustrated in FIG. 3 gives significant improved performance in the long-range detection of weak signals over the use of the original tri-cardioid system without the addition of the mirror image teachings of this invention. The proposed two-cardioid system with the addition of the mirror image teachings of this invention provides an economical assembly by using only two physical structures with cardioid directional receiving patterns which becomes a four-cardioid directional receiving system by utilizing the mirror image teachings of this invention. This specific configuration of a multi-cardioid array design provides a very significant improvement in signal-to-noise ratio at reduced cost over the single tri-cardioid array.

Although a few specific examples have been given to illustrate the advantages of the disclosed invention, it should be understood that additional modifications and alternative constructions may be made without departure from the true spirit and scope of the invention. Therefore, the appended claims are intended to cover all such equivalent alternative constructions that fall within their true spirit and scope.

I claim:

1. In combination in a directional energy receiving system, a plurality of N identical directional receiving transducers, each transducer having a vertical axis, each transducer characterized in that its directional pattern in a horizontal plane perpendicular to said vertical axis is defined by its receiving sensitivity S as a function of angle θ from its principal axis of maximum sensitivity by the approximate relationship S=(1 +cos θ) over an angle of ±360/2N° from its principal axis, a first electronic circuit means for producing from said transducers a duplicate mirror image of the directional pattern of each of said N directional receiving transducers, said mirror images characterized in that the principal axes of maximum sensitivity of each of said mirror images of said N directional patterns are rotated 180° from each of the corresponding principal axes of each of the original patterns of said N receiving transducers, structural support means for mounting said directional receiving transducers, said structural means characterized in that the principal axes of maximum sensitivity of each of said mounted directional transducers together with the principal axes of maximum sensitivity of each of the mirror images of each of said mounted N directional transducers are equally spaced in a symmetrical array such that the combined axes of maximum sensitivity of said N directional transducers and said N mirror images of said directional transducers are oriented 360/2N° from one another in said horizontal plane.

2. The invention in claim 1 and second electronic circuit means connected to the outputs of each of said directional receiving transducers and to each of the outputs of the mirror images of said transducers, said second electronic circuit means including signal processing means for comparing the ratios of the magnitudes of the output signal levels generated in any combination of adjacent pairs of transducers or in any combination of adjacent pairs of the mirror images of said transducers or in any combination of any neighboring pair combination of any transducer and the mirror image of any transducer when said array is receiving an energy signal which is arriving from a direction whose bearing angle relative to a particular fixed reference mechanical axis of said mounted array structure is desired to be measured, and indicator means selectively responsive to the ratios of the relative magnitudes of said comparative output signal levels from any combination of said pairs of transducers and mirror images of said transducers, said indicator means characterized in that it responds to the ratios of the relative magnitudes of said comparative output signals, and further characterized in that it indicates the bearing angle of the path along which said energy signal is traveling.

3. In combination in a directional energy receiving system, two identical directional receiving transducers, each transducer having a vertical axis, each transducer characterized in that its receiving sensitivity S in a horizontal plane perpendicular to said vertical axis as a function of angle θ from its principal axis of maximum sensitivity is defined by the approximate relationship S=(1+cos θ) over an angle of ±90° from its principal axis of maximum sensitivity, a first electronic circuit means for producing from said transducers a duplicate mirror image of the directional pattern of each of said two directional receiving transducers, said mirror images characterized in that the principal axis of maximum sensitivity of each of said two mirror images of said two directional patterns is rotated 180° from each of the corresponding principal axes of each of the original directional patterns of said two receiving transducers, structural support means for mounting said two directional receiving transducers with the principal axis of maximum sensitivity of each directional transducer pointing 90° apart in relative bearing from each other, said structural support means characterized in that the principal axes of maximum sensitivity of each of said mounted transducers together with the principal axes of maximum sensitivity of each of the mirror images of each of said two mounted directional transducers are equally spaced in a symmetrical array such that the axes of maximum sensitivity of said two directional transducers and said two mirror images are oriented 90° apart in relative bearing from one another.

4. The invention in claim 3 and second circuit means connected to the outputs of each of said directional receiving transducers and to each of the outputs of the mirror images of said transducers, said second electronic circuit means including signal processing means for comparing the ratios of the magnitudes of the output signal levels generated in any combination of said adjacent pair of transducers or in any combination of the mirror images of said adjacent pair of transducers or between any combination of any neighboring pair combination of any transducer and the mirror image of any transducer when said receiving array is receiving an energy signal which is arriving from a direction whose bearing angle relative to a particular fixed reference mechanical axis of said mounted array structure is unknown, and indicator means selectively responsive to the ratios of the relative magnitudes of said comparative output signal levels from any combination of said pair of transducers and mirror images of said transducers, said indicator means characterized in that it responds to the ratios of the relative magnitudes of said comparative output signals, and further characterized in that it indicates the unknown bearing angle.

5. In combination in a directional energy receiving system, three identical directional receiving transducers, each transducer having a vertical axis, each transducer characterized in that its receiving sensitivity S in a horizontal plane perpendicular to said vertical axis as a function of angle θ from its principal axis of maximum sensitivity is defined by the approximate relationship S=(1+cos θ) over an angle of approximately ±60° from its principal axis, a first electronic circuit means for producing from said transducers a duplicate mirror image of the directional pattern of each of said three directional receiving transducers, said mirror images characterized in that the principal axes of maximum sensitivity of each of said three mirror images of said three directional patterns are rotated 180° from each of the corresponding principal axes of each of the original directional patterns of said three receiving transducers, structural support means for mounting said three directional receiving transducers, said structural support means characterized in that the principal axes of maximum sensitivity of each of said three mounted directional transducers together with the axes of maximum sensitivity of the mirror images of each of said three mounted transducers are equally spaced in a symmetrical array such that the six principal axes of maximum sensitivity of said combined three transducers and said three mirror images are oriented 60° apart in relative bearing from one another.

6. The invention in claim 5 and second electronic circuit means connected to the outputs of each of said directional receiving transducers and to each of the outputs of the mirror images of said transducers, said second electronic circuit means including signal processing means for comparing the ratios of the magnitudes of the output signal levels generated in any combination of any adjacent pairs of transducers or any adjacent pairs of mirror images of transducers in the array or between any neighboring pair combination of any transducer with the mirror image of any transducer when said receiving array is activated by an energy signal which is arriving from a direction whose bearing angle relative to a particular fixed reference mechanical axis of said mounted array structure is unknown, and indicator means selectively responsive to the ratios of the relative magnitudes of said comparative output signal levels from any combination of said pairs of transducers and mirror images of said transducers, said indicator means characterized in that it responds to the ratios of the relative magnitudes of said comparative output signals, and further characterized in that it indicates said unknown bearing angle.

* * * * *